(12) United States Patent
Ullah

(10) Patent No.: US 9,482,158 B2
(45) Date of Patent: Nov. 1, 2016

(54) TURBOMACHINE HYBRID LIFT-OFF FACE SEAL

(71) Applicant: United Technologies Corporation, Hartford, CT (US)

(72) Inventor: M. Rifat Ullah, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 982 days.

(21) Appl. No.: 13/719,636

(22) Filed: Dec. 19, 2012

(65) Prior Publication Data

US 2014/0086741 A1 Mar. 27, 2014

Related U.S. Application Data

(60) Provisional application No. 61/704,105, filed on Sep. 21, 2012.

(51) Int. Cl.
*F02C 7/28* (2006.01)
*F01D 11/04* (2006.01)

(52) U.S. Cl.
CPC .......... *F02C 7/28* (2013.01); *F01D 11/04* (2013.01)

(58) Field of Classification Search
CPC ...... F16J 15/3412; F01D 11/003; F02C 7/28
See application file for complete search history.

(56) References Cited

U.S. PATENT DOCUMENTS

| 3,704,019 | A | 11/1972 | McHugh |
| 4,523,764 | A * | 6/1985 | Albers .................. F16J 15/342 277/400 |
| 5,174,584 | A | 12/1992 | Lahrman |
| 5,180,173 | A | 1/1993 | Kimura et al. |
| 5,941,532 | A | 8/1999 | Flaherty et al. |
| 7,175,388 | B2 | 2/2007 | Labbe et al. |
| 8,109,717 | B2 | 2/2012 | Glahn et al. |
| 8,162,322 | B2 * | 4/2012 | Flaherty ............... F16J 15/3412 277/398 |
| 2011/0299984 | A1 | 12/2011 | Garrison |
| 2011/0304101 | A1 | 12/2011 | Grondahl et al. |

FOREIGN PATENT DOCUMENTS

| EP | 1790833 A2 | 5/2007 |
| EP | 2233700 B1 | 9/2010 |

OTHER PUBLICATIONS

International Search Report and Written Opinion for International Application No. PCT/US2013/059176 completed on Dec. 19, 2013.
International Preliminary Report on Patentability for International Application No. PCT/US2013/059176 mailed Apr. 2, 2015.

* cited by examiner

*Primary Examiner* — Igor Kershteyn
(74) *Attorney, Agent, or Firm* — Carlson, Gaskey & Olds, P.C.

(57) ABSTRACT

A turbomachine seal includes, among other things, a sealing member configured to be influenced by both hydrostatic and hydrodynamic forces when providing a seal.

22 Claims, 4 Drawing Sheets

TURBOMACHINE HYBRID LIFT-OFF FACE SEAL

CROSS-REFERENCE TO RELATED APPLICATIONS

This application claims priority to U.S. Provisional Application No. 61/704,105, which was filed on 21 Sep. 2012 and is incorporated herein by reference.

BACKGROUND

Turbomachines, such as gas turbine engines, typically include a fan section, a compression section, a combustion section, and a turbine section. Turbomachines may employ a geared architecture connecting portions of the compression section to the fan section. Turbomachines include various seals. The seals may be lift-off seals.

Some lift-off seals rely exclusively on hydrodynamic forces to move the seal to a position appropriate for establishing a sealing film of air. At low pressures, low speeds, high biasing loads, etc., the hydrodynamic forces may be inadequate. The lift-off seal may undesirably touchdown if the hydrodynamic forces are inadequate.

Other lift-off seals rely exclusively on hydrostatic forces to move the seal to a position appropriate for establishing the sealing film of air. Under some operating conditions, the hydrostatic forces are inadequate and touchdown may undesirably occur.

SUMMARY

A turbomachine seal according to an exemplary aspect of the present disclosure includes, among other things, a sealing member configured to be influenced by both hydrostatic and hydrodynamic forces when providing a seal.

In a further non-limiting embodiment of the foregoing turbomachine seal, the sealing member may limit flow of a turbomachine fluid when providing the seal.

In a further non-limiting embodiment of either of the foregoing turbomachine seals, the sealing member may lift off from a rotating seal face when providing the seal.

A seal assembly according to another exemplary aspect of the present disclosure includes, among other things, a first seal member movable from a first position to a second position in response to both a hydrostatic and a hydrodynamic force. The first seal member contacting a second seal member when in the first position, the first seal member spaced from the second seal member when in the second position.

In a further non-limiting embodiment of the foregoing turbomachine seal assembly, the first and second seal members may provide a sealing interface when the first seal member is in the second position, the sealing interface limiting flow of a fluid from a first side of the sealing interface to an opposing, second side of the sealing interface.

In a further non-limiting embodiment of either of the foregoing turbomachine seal assemblies, the fluid may be a first fluid, and a different second fluid is communicated to the sealing interface to provide the hydrostatic and hydrodynamic forces.

In a further non-limiting embodiment of any of the foregoing turbomachine seal assemblies, the second seal member may be rotated relative to the first seal member when providing the sealing interface.

In a further non-limiting embodiment of any of the foregoing turbomachine seal assemblies, the sealing interface may be an annular sealing interface.

In a further non-limiting embodiment of any of the foregoing turbomachine seal assemblies, the first fluid may be an oil of a bearing compartment within a turbomachine.

In a further non-limiting embodiment of any of the foregoing turbomachine seal assemblies, the first seal member may be spring biased toward the first position.

In a further non-limiting embodiment of any of the foregoing turbomachine seal assemblies, the first seal member may be a lift-off seal.

In a further non-limiting embodiment of any of the foregoing turbomachine seal assemblies, one of the first or the second seal members may provide a at least one conduit that directs a fluid toward the other of the first or the second seal to provide the hydrostatic forces.

In a further non-limiting embodiment of any of the foregoing turbomachine seal assemblies, the first seal may be configured to rotate relative to the second seal about an axis, and the at least one conduit directs the fluid toward the other of the first or second seal in an axial direction.

In a further non-limiting embodiment of any of the foregoing turbomachine seal assemblies, the fluid may be first fluid, and one of the first or the second seal member provides a plurality of grooves that communicates a second fluid that is different from the first fluid to the sealing interface to provide the hydrodynamic forces.

In a further non-limiting embodiment of any of the foregoing turbomachine seal assemblies, the first seal may be configured to rotate relative to the second seal about an axis, and the plurality of grooves are provided by the first seal.

In a further non-limiting embodiment of any of the foregoing turbomachine seal assemblies, the plurality of grooves may extend from the first side and terminate partially within the sealing interface.=

In a further non-limiting embodiment of any of the foregoing turbomachine seal assemblies, one of the first or the second seal members may provide at least one conduit that directs the second fluid from the second side to the sealing interface to provide the hydrostatic forces.

In a further non-limiting embodiment of any of the foregoing turbomachine seal assemblies, the plurality of grooves may communicate the second fluid to a first area of the sealing interface, and the at least one conduit directs the second fluid to a different second area of the sealing interface.

A method of sealing an interface according to another exemplary aspect of the present disclosure includes, among other things, moving a seal member to a sealing position using both hydrostatic and hydrodynamic forces, and limiting movement of a turbomachine fluid when the seal member is in the sealing position.

In a further non-limiting embodiment of the foregoing method of sealing an interface, the method may include moving including moving the seal member to the sealing position from a position wherein the sealing member is contacting a seal face, the sealing member spaced from the seal face when in the sealing position.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
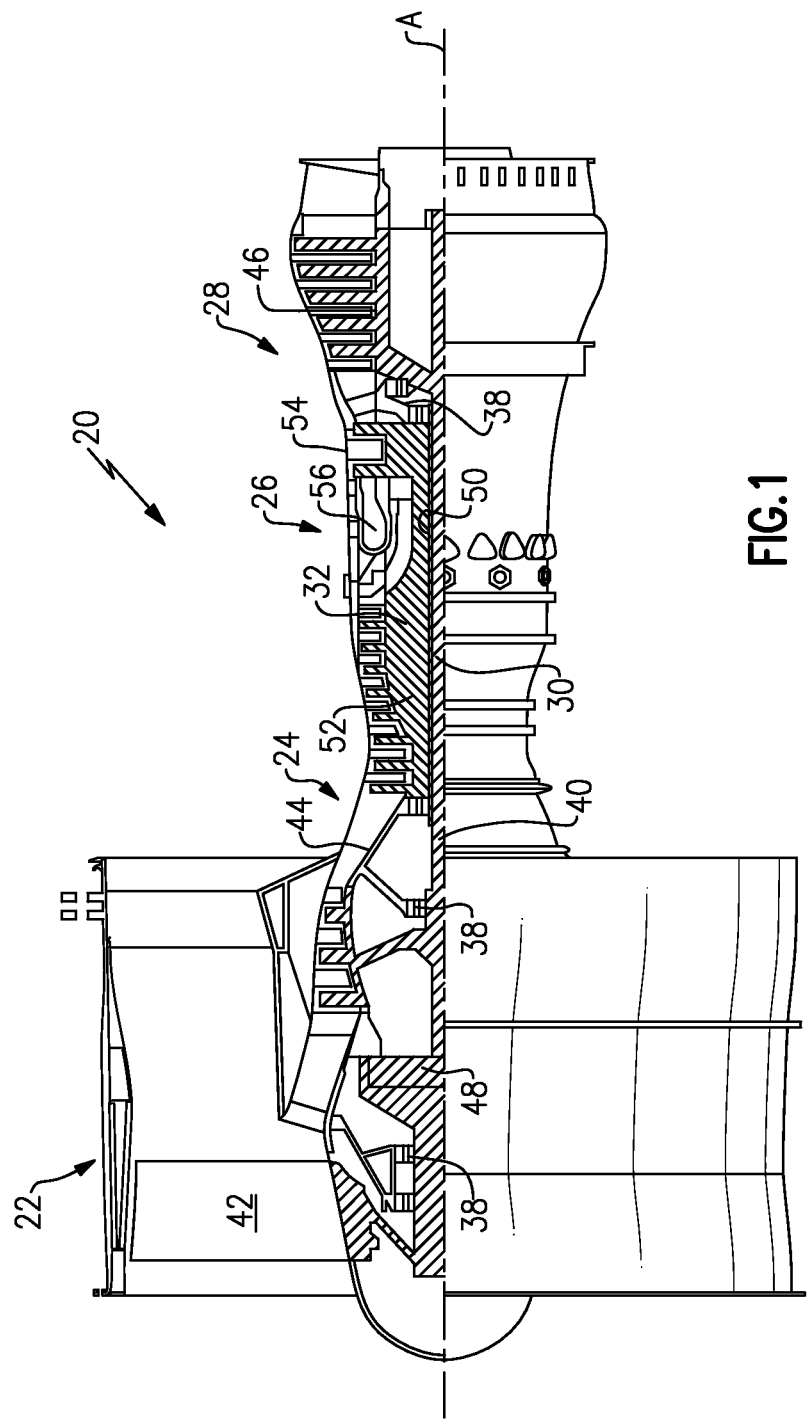
FIG. 1 shows a cross section view of an example turbomachine.
Figure 2:
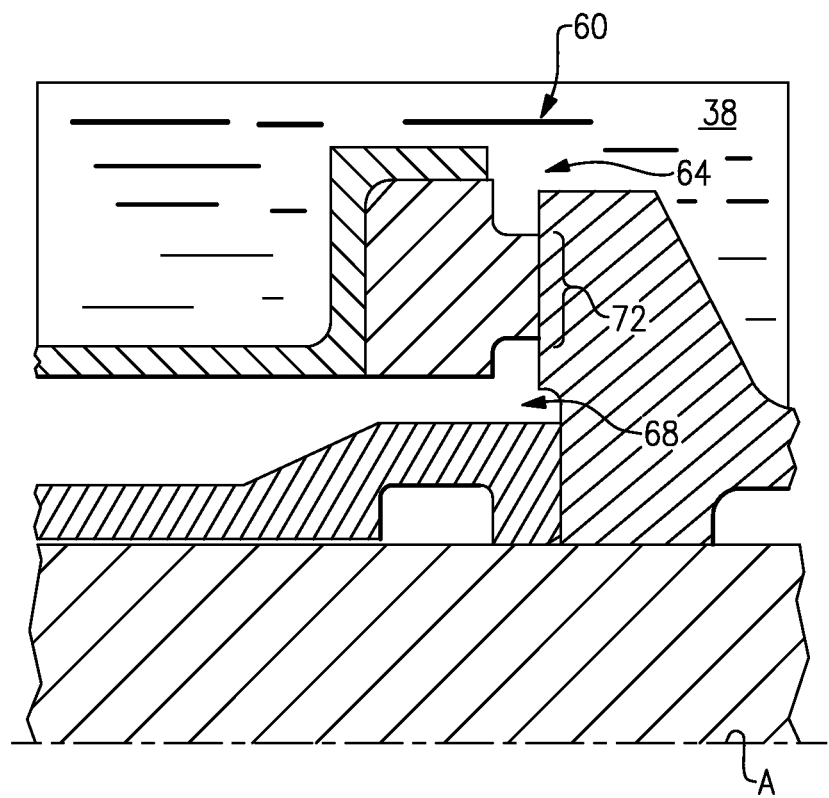
FIG. 2 shows a close-up view of a sealed area of the turbomachine of FIG. 1.
Figure 3:
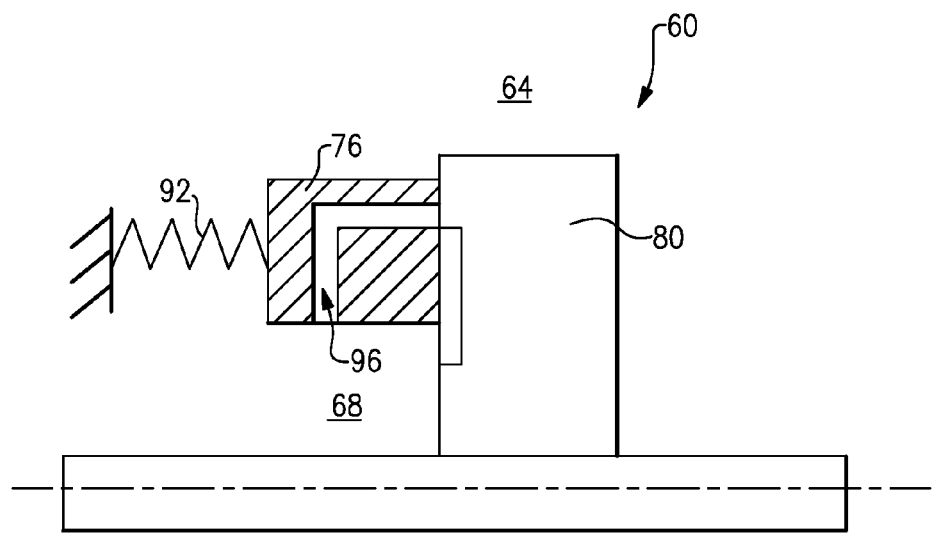
FIG. 3 shows an example seal assembly from the sealed area of FIG. 2 in a first position.
Figure 4:
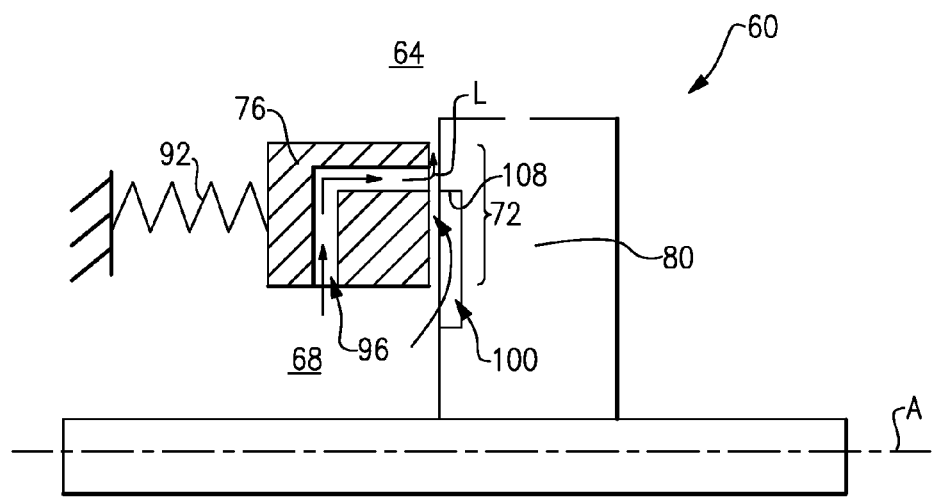
FIG. 4 shows an example seal assembly from the sealed area of FIG. 2 in a second position.
Figure 5:
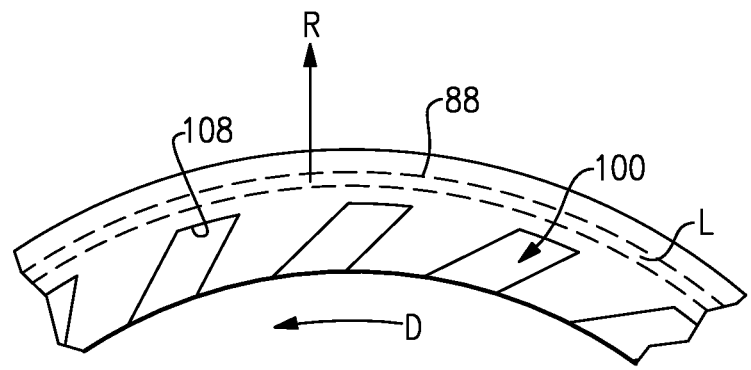
FIG. 5 shows a seal face of the assembly of FIGS. 3 and 4.
Figure 6:
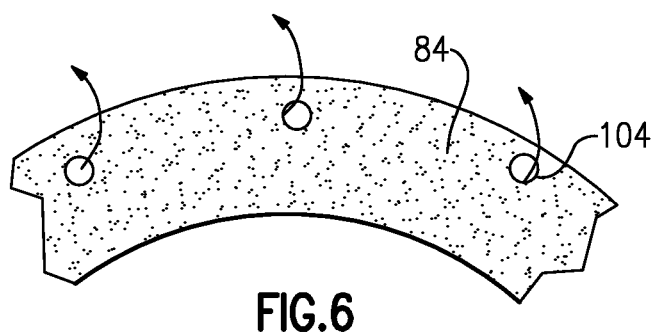
FIG. 6 shows another seal face of the assembly of FIGS. 3 and 4.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates forward thrust. The compression section 24 drives air along a core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low-pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

"Low Corrected Fan Tip Speed" is the actual fan tip speed in ft/sec divided by an industry standard temperature correction of $[(Tram\ °\ R)/(518.7°\ R)]^{\wedge}0.5$. The Temperature represents the ambient temperature in degrees Rankine. The Low Corrected Fan Tip Speed according to one non-limiting embodiment of the example engine 20 is less than about 1150 fps (351 m/s).

Referring to FIGS. 2-6 with continuing reference to FIG. 1, the bearing systems 38 within the engine 20 typically hold a lubricating fluid, such as a lubricating oil. A seal assembly 60 is used, in this example, to keep the lubricating fluid within the bearing system 38. The seal assembly is within a sealed area of the engine 20.

The example seal assembly 60 is a lift-off seal that utilizes a film of air to limit movement of the lubricating fluid from a first side 64 of the seal assembly 60 to a second side 68 of the seal assembly 60 and to reduce undesirable heat generation at the sealing interface 72 due to absence of contact of the seal with the mating runner in the lifted position.

During operation of the engine 20, a film of air communicates across a sealing interface 72 from the second side 68 to the first side 64 to limit movement of the lubricating fluid. In this example, the lubricating fluid is a first fluid, and the air is a second fluid.

Air on the second side 68 is at a relatively higher pressure than the first side 64. The pressure differential causes movement of air from the second side 68 to the first side 64. The compression section 24 of the engine 20 provides the high-pressure air to the second side 68 in this example.

The example seal assembly 60 includes a first seal member 76 and a second seal member 80. A seal face 84 of the first seal member 76 faces a seal face 88 of the second seal member 80. The sealing interface 72 is provided by the facing portions of the seal face 84, the seal face 88, and air communicated therebetween.

The example first seal member 76 is biased by a spring 92 toward the seal face 88 in an axial direction. Air communicated through the sealing interface 72 overcomes at least some of the spring biasing force. Overcoming the biasing force causes the first seal member 76 to separate from the seal face 88 such that the first seal member 76 is spaced from the second seal member 80. The air communicated through the sealing interface 72 overcomes the biasing force and moves first seal member 76 from a first position (FIG. 3) where the first seal member 76 contacts the second seal member 80 to a second position (FIG. 4) where the first seal member 76 is spaced from the second seal member 80. The first seal member 76 utilizes both hydrostatic and hydrodynamic forces to overcome the spring biasing force.

In this example, the first seal member 76 includes a at least one conduits 96. Air from the second side 68 communicates through the at least one conduit 96 to directly contact the seal face 88 at a location L. Directing air toward the seal face 88 from the first seal member 76 in this way helps overcome the spring bias force and moves the first seal member 76 axially away from the second seal member 80. The at least one conduit 96 helps provide the hydrostatic force to the first seal member 76 in this example. A hydrostatic pressure peak is applied directly to the sealing interface 72.

The second seal member 80 includes a plurality of grooves 100 (or relatively shallow trenches) that open to the seal face 84. The grooves 100 extend radially from the second side 68 to at least the sealing interface 72. The grooves may be spiral grooves that are angled relative to a radial direction r, or the grooves may be of various other forms that create the hydrodynamic lift force. The second seal member 80 rotates about the axis A during operation of the engine 20 in a direction D. The grooves 100 are angled away from the direction of rotation of the second seal member 80.

Air from the second side 68 fills the grooves 100. When the second seal member 80 rotates, the pressure of this air increases. The higher pressure air within the grooves 100 helps overcome the spring biasing force and helps to move the first seal member 76 away from the second seal member 80. The grooves 100 help provide the hydrodynamic force to the first seal member 76 in this example. The grooves 100 provide the hydrodynamic pressure peak to the sealing interface 72.

Air from the at least one conduit 96 exits the first seal member 76 at outlets 104. In this example, these outlets 104 are radially outside a radially outer end 108 of the plurality of grooves 100. In other examples, the outlets 104 may radially overlap some portion of the plurality of grooves 100.

Air that has exited the conduits 96 and the grooves 100 flows radially along the sealing interface 72 to the first side 64. The movement of air from the second side 68 to the first side 64 provides a film seal that limits movement of oil from the first side 64 to the second side 68.

Although the example seal assembly includes at least one conduit 96 in the first seal member 76, the at least one conduit 96 may be located within the second seal member 80 in another example. In still other examples, both the first seal member 76 and the second seal member 80 may include conduits.

Also, although grooves 100 are incorporated into the second seal member 80, the grooves may be incorporated elsewhere in other examples.

The first seal member 76 is carbon based in this example. The first seal member 76 is considered a wear member.

Touching down the first seal member 76 such that the seal face 84 contacts the seal face 88 causes the first seal member 76 to wear. The hydrostatic forces and the hydrodynamic forces move the first seal member 76 away from the second seal member 80 to limit such wear while still providing a film seal.

Features of the disclosed examples include a hybrid lifting scheme for a mechanical seal that utilizes a combination of concurrent hydrostatic and hydrodynamic forces to move a seal. Since both lift mechanisms are used, the seal may perform in a relatively wider design space (speeds, pressures, temperatures, etc.) than prior art seals.

The hybrid lift-off seal may also be better at handling inherent variations in the design features of either the hydrodynamic or the hydrostatic seal prior arts, thereby reducing part tolerances and thus manufacturing costs. The disclosed examples may be used in applications where conventional hydrodynamic or hydrostatic seals are used.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A turbomachine seal, comprising:
    a first seal member configured to be influenced by both hydrostatic and hydrodynamic forces when providing a seal interface together with a second seal member, the first seal member including a conduit that communicates flow to provide the hydrostatic forces, the second seal including grooves that communicate fluid to provide the hydrodynamic force.

2. The turbomachine seal of claim 1, wherein the first seal is lifted off from a rotating seal face of the second seal member when providing the seal interface.

3. The turbomachine seal of claim 2, wherein the grooves extend radially inward past the seal interface between the first seal and the second seal.

4. The turbomachine seal of claim 3, wherein the grooves are angled away from the direction of rotation of the second seal member.

5. A seal assembly, comprising:
    a first seal member movable from a first position to a second position in response to both a hydrostatic and a hydrodynamic force, the first seal member contacting a second seal member when in the first position, the first seal member spaced from the second seal member when in the second position, the first seal member including a conduit to communicate a fluid that provides the hydrostatic force, the second seal member including grooves that communicate a fluid to provide the hydrodynamic force.

6. The seal assembly of claim 5, wherein the first and second seal members provide a sealing interface when the first seal member is in the second position, the sealing interface limiting flow of a fluid from a first side of the sealing interface to an opposing, second side of the sealing interface.

7. The seal of claim 6, wherein the fluid is a first fluid, and a different second fluid is communicated to the sealing interface to provide the hydrostatic and hydrodynamic forces.

8. The seal of claim 6, wherein the second seal member is rotated relative to the first seal member when providing the sealing interface.

9. The seal of claim 6, wherein the sealing interface is an annular sealing interface.

10. The seal of claim 6, wherein the first fluid is oil of a bearing compartment within a turbomachine.

11. The seal of claim 5, wherein the first seal member is spring biased toward first position.

12. The seal of claim 5, wherein the first seal member is a liftoff seal.

13. The seal of claim 5, wherein the first seal is configured to rotate relative to the second seal about an axis, and the conduit directs the fluid toward the second seal in an axial direction.

14. The seal of claim 6, wherein the fluid is a first fluid, and the second seal member provides the plurality of grooves that communicates a second fluid that is different from the first fluid to the sealing interface to provide the hydrodynamic forces.

15. The seal of claim 14, wherein the first seal is configured to rotate relative to the second seal about an axis.

16. The seal of claim 14, wherein the plurality of grooves extend from the first side and terminate within the sealing interface.

17. The seal of claim 14, wherein the first seal member directs the second fluid from the second side to the sealing interface to provide the hydrostatic forces.

18. The seal of claim 5, wherein the grooves communicate the second fluid to a first area of the sealing interface, and the conduit directs the second fluid to a different second area of the sealing interface.

19. The seal assembly of claim 6, wherein the grooves extend radially inward past the seal interface and are angled away from a direction of rotation of the second seal member.

20. A method of sealing an interface, comprising:
moving a first seal member to a sealing position using both hydrostatic and hydrodynamic forces;
limiting movement of a turbomachine fluid when the first seal member is in the sealing position with a second seal member;
communicating fluid through a conduit in the first seal member to provide the hydrostatic forces; and
communicating fluid through a plurality of grooves in the second seal member to provide the hydrodynamic forces.

21. The method of claim 20, including moving the seal member to the sealing position from a position wherein the sealing member is contacting a seal face, the sealing member spaced from the seal face when in the sealing position.

22. The seal assembly of claim 20, wherein the plurality of grooves extend radially inward past the first seal member and are angled away from a direction of rotation of the second seal member.

* * * * *